United States Patent
Brown et al.

(10) Patent No.: US 7,466,706 B2
(45) Date of Patent: *Dec. 16, 2008

(54) CONTROLLED TRANSMISSIONS ACROSS PACKET NETWORKS

(75) Inventors: John Carl Brown, Matawan, NJ (US); Larry Arnise Russell, Atlantic Highlands, NJ (US)

(73) Assignee: AT&T Corp., New York, NY (US)

( * ) Notice: Subject to any disclaimer, the term of this patent is extended or adjusted under 35 U.S.C. 154(b) by 775 days.

This patent is subject to a terminal disclaimer.

(21) Appl. No.: 10/897,943

(22) Filed: Jul. 23, 2004

(65) Prior Publication Data

US 2005/0025146 A1     Feb. 3, 2005

Related U.S. Application Data

(63) Continuation of application No. 09/664,597, filed on Sep. 18, 2000, now Pat. No. 6,870,841.

(51) Int. Cl.
    *H04L 12/66*     (2006.01)
    *H04L 12/28*     (2006.01)
    *G01R 31/08*     (2006.01)
    *G06F 9/00*     (2006.01)

(52) U.S. Cl. .................. 370/392; 370/352; 370/389; 370/252; 726/13; 726/14

(58) Field of Classification Search .............. 370/389, 370/466, 465, 392, 352, 401, 395.31, 395.5, 370/395.51, 467, 400, 395.1, 395.2, 412; 713/153

See application file for complete search history.

(56) References Cited

U.S. PATENT DOCUMENTS

| | | | |
|---|---|---|---|
| 3,524,395 A | 8/1970 | Alasia | |
| 3,635,778 A | 1/1972 | Rice et al. | |
| 3,642,346 A | 2/1972 | Dittmar | |
| 3,784,289 A | 1/1974 | Wicker | |
| 3,937,565 A | 2/1976 | Alasia | |
| 4,092,654 A | 5/1978 | Alasia | |
| 4,198,147 A | 4/1980 | Alasia | |
| 4,303,307 A | 12/1981 | Tureck et al. | |
| 4,715,623 A | 12/1987 | Roule et al. | |
| 4,914,700 A | 4/1990 | Alasia | |
| 5,027,401 A | 6/1991 | Soltesz | |
| 5,113,213 A | 5/1992 | Sandor et al. | |
| 5,178,418 A | 1/1993 | Merry et al. | |
| 5,195,435 A | 3/1993 | Morrone et al. | |

(Continued)

FOREIGN PATENT DOCUMENTS

EP     0598357 B1     5/1994

(Continued)

*Primary Examiner*—Hanh Nguyen
(74) *Attorney, Agent, or Firm*—Henry Brendzel

(57) ABSTRACT

Control over the movement of packets is exercised by edge nodes of a network mapping the addresses of incoming packets in accordance with a prespecified functional mapping P. Remote sources of packets are provided address information that is mapped with a prespecified functional mapping Q, where mappings P and Q are such that $P(Q(j))=j$. The mapping change at regular intervals, or upon the occurrence of specified events, and with each change, the communicating the remote source is provided with a different mapped address to be used.

4 Claims, 5 Drawing Sheets

NOTE: $PQ(X)=X$

U.S. PATENT DOCUMENTS

| | | | |
|---|---|---|---|
| 5,303,370 | A | 4/1994 | Brosh et al. |
| 5,396,559 | A | 3/1995 | McGraw |
| 5,438,429 | A | 8/1995 | Haeberli et al. |
| 5,708,717 | A | 1/1998 | Alasia |
| 5,735,547 | A | 4/1998 | Morelle et al. |
| 5,830,609 | A | 11/1998 | Warner et al. |
| 5,904,375 | A | 5/1999 | Brugada |
| 5,974,150 | A | 10/1999 | Kaish et al. |
| 6,084,713 | A | 7/2000 | Rosenthal |
| 6,104,812 | A | 8/2000 | Koltai et al. |
| 6,171,734 | B1 | 1/2001 | Warner et al. |
| 6,178,181 | B1 * | 1/2001 | Glitho ................. 370/467 |
| 6,222,650 | B1 | 4/2001 | Long |
| 6,252,963 | B1 | 6/2001 | Rhoads |
| 6,256,150 | B1 | 7/2001 | Rosenthal |
| 6,280,891 | B2 | 8/2001 | Daniel et al. |
| 6,343,138 | B1 | 1/2002 | Rhoads |
| 6,414,794 | B1 | 7/2002 | Rosenthal |
| 6,507,908 | B1 * | 1/2003 | Caronni ................. 713/153 |
| 6,529,524 | B1 * | 3/2003 | Liao et al. ............. 370/467 |
| 6,654,346 | B1 * | 11/2003 | Mahalingaiah et al. ...... 370/235 |
| 6,661,799 | B1 * | 12/2003 | Molitor ................. 370/401 |
| 6,711,684 | B1 * | 3/2004 | Moroney et al. ............ 713/191 |
| 6,870,841 | B1 * | 3/2005 | Brown et al. ............ 370/389 |
| 2001/0005570 | A1 | 6/2001 | Daniel et al. |
| 2002/0008380 | A1 | 1/2002 | Taylor et al. |
| 2002/0185857 | A1 | 12/2002 | Taylor et al. |
| 2003/0012562 | A1 | 1/2003 | Lawandy et al. |
| 2003/0015866 | A1 | 1/2003 | Cioffi et al. |
| 2003/0137145 | A1 | 7/2003 | Fell et al. |

FOREIGN PATENT DOCUMENTS

| | | |
|---|---|---|
| EP | 1147912 A2 | 10/2001 |
| GB | 1407065 | 9/1975 |
| WO | WO 92/04692 | 3/1992 |
| WO | WO 93/15491 | 8/1993 |
| WO | WO 94/07326 | 3/1994 |
| WO | WO 98/15418 | 4/1998 |
| WO | WO 01/87632 A1 | 11/2001 |

* cited by examiner

CONTROLLED TRANSMISSIONS ACROSS PACKET NETWORKS

RELATED APPLICATIONS

This is a continuation of U.S. patent application Ser. No. 09/664,597, files Sep. 18, 2000 now U.S. Pat. No. 6,870,841.

BACKGROUND

This invention relates to packet communication and, more particularly, to fee-based communication across multiple packet networks.

Most US telecommunication providers currently employ packet networks to transport both voice and data signals. Such a network, shown in FIG. 1, transports information in packets that are routed from router to router (e.g. from router 301 to router 302), via links (e.g., 303), from an originating point in the network to a terminating point in the network.

FIG. 1 depicts a typical arrangement for coupling a user 11 in one location (for example, New York) to a user 12 in another location (for example, Los Angeles). User 11 is connected to a local circuit-switched network 100 in New York (e.g., Verizon), and more particularly to a central office 12 within network 100. Similarly, user 21 is connected to a local circuit-switched network 200 in Los Angeles (e.g., PacTel), and more particularly to a central office 22 within network 200.

When a call from user 11 to user 21 is assigned to traverse packet network 300 that employs, for example, the IP protocol, central office 12 sends signaling information to VoP gateway 10 that couples network 100 to packet network 300. Gateway 10 translates and converts the received signaling information to a chosen signaling format, for example Media Gateway Control Protocol (MGCP) over IP, and forwards the signaling packets to call agent 15. The signaling packets contain information such as the identity of the called party and the identity of the calling party. Call agent 15 queries database 16 (with the destination of called party 21) to identify an appropriate call agent for completing the connection, and receives the IP address of PacTel call agent 25. Call agent 15 then sends an Initial Address Message (IAM) to call agent 25, requesting the IP address of the appropriate VoP gateway for completing the call. Call agent 25 queries its database (26), obtains the IP address of VoP 20, and forwards that information in an Address Complete Message (ACM) to call agent 15. The communication path between the call agents is not shown, for sake of clarity. The communication itself can employ the Bearer Independent Call Control (BICC) protocol. The IP address of VoP gateway 10 is communicated to VoP gateway 20 by call agent 25, the IP address of VoP gateway 20 is communicated to VoP gateway 10 by call agent 15, and henceforth gateways 10 and 20 can communicate using the respective IP addresses by employing, for example, Real-Time Protocol (RTP).

Although the FIG. 1 arrangement depicts VoP gateways 10 and 20 coupling packet network 300 to respective Public Switched Telephone Networks (PSTNs) 100 and 200, they can be connected directly to user devices such as telephones. The functionality of a VoP gateway can even be embedded in devices to form packet phones or integrated packet-circuit voice integrated switching systems. When embedded in Customer Premises Equipment such gateways are sometimes called Media Terminal Adapters (MTAs). These can also be called untrusted end points. Call agents are sometimes called Call Servers or Call Proxy Servers.

When there are multiple call agents in a network arrangement, as shown in FIG. 1, each one typically communicates with a subset of gateways under its control. Each of these subsets is a domain. When it is desired to set up a call between domains, for example, domains 306 and 307, the respective call agents communicate with each other, as described above.

In the above example, network 300 was chosen to employ the Internet Protocol (IP), but it should be understood that Asynchronous Transfer Mode (ATM), Frame Relay (FR) or any other packet protocol that is suitable for transporting voice packets may be employed. The call set-up procedure for non-IP packet networks is similar to the procedure outlined above for IP networks.

A highly desirable characteristic of the FIG. 1 arrangement is the separation of Call Control from Connection Control. In this model, the techniques, signaling messages, procedures, etc., used to establish the logical voice connection between end-users is independent of the techniques, signaling messages, procedures etc., used to establish the connection that carries the voice packets in the packet network. In this way, customers can have and retain the same voice features regardless of whether the underlying transport technology is circuit-switched or packet-switched and regardless of what packet protocol is used, as long as it meets the basic requirements for a voice connection.

As long as the packet network is a single and homogeneous network, packets can travel throughout the network unimpeded, as implied by FIG. 1. However, neither Verizon nor PacTel own a packet network that extends from New York to Los Angeles, and their networks do not even meet. That presents no technological problem when the individual networks that comprise packet network 300 employ the same formats and the same protocols. When they do not, however, the packet voice must be converted from a first format and protocol to a second format and protocol; often via an intermediate step of converting signals to conventional circuit-switched format. This is typically done through a pair of back-to-back gateways. Even if the various networks that comprise network 300 use identical protocols, when the networks are owned by different entities the back-to-back gateways are nevertheless used at the interfaces where network ownership changes. The reason for this is quite simple: both Verizon and PacTel want to get paid for providing the connection between users 11 and 12, and the back-to-back gateways at the interfaces where ownership changes can exercise the desired connection control. Otherwise, one or both of the telecommunication providers might get shortchanged.

For example, once gateways 10 and 20 have obtained each other's IP addresses, there is no reason for them to use the call agents to set up the call. Of course, when gateway 10 is under control of the telecommunication service provider of domain 306, user 11 cannot communicate over network 300 without permission from the provider. However, as indicated above, MTAs connect directly to the packet network, and those are not under control of the telecommunication service provider.

While obtaining transmission for "free" might be fine for the public Internet, a carrier that provides an IP based network that meets strict Quality of Service (QoS) objectives required for high quality voice believes to be entitled to be compensated for the use of this IP network. The process that insures the compensation is under control of the call agent, where all billing for usage as well as any special call features may be centralized. In addition, voice is usually billed on a duration basis, not a packet basis, and the packet network has no knowledge of call duration. Therefore, it is required that gateways 10 and 20 (or corresponding MTAs) be allowed to send packets to each only when allowed by the call agents.

If, instead, one were to decide to bill on a packet usage basis, governed by the IP network, the gateways might use the call agent to exchange IP addresses but never use the IP network to exchange voice packets, preferring to use some other (cheaper) network. Therefore, even in the case of billing on a packet usage basis, it is required that there be an affirmative control by the call agent of the connections through network 300.

Another consideration is that, for security reasons, users may not want their "true" IP address to be disclosed to others. This is particularly true if a user is in a private network behind a proxy firewall.

One solution to this problem is presented in FIG. 2, where call agent 15 communicates with a special router 313 at the edge of domain 306 (via line 308), and call agent 25 communicates with special router 323 at the edge of domain 307 (via line 309). These special edge switches route packets only if they carry an IP address that was explicitly authorized by a call agent. In specifying the authorized IP addresses, the call agent is also able to specify the QoS level being paid for, and that provides the edge switches with information necessary to choose between packets that are to be routed vs. packets that are to be buffered, when the transmission load calls for buffering of some packets. To prohibit the gateways from being used without the packet network, the IP addresses are never communicated end to end. Call agent 25 maps the IP address that leads to user 21 into an arbitrary IP address and communicates the arbitrary/true IP address mapping to its edge switches. It then communicates the arbitrarily selected IP address to call agent 15 and, thence, to gateway 10. Similarly, call agent 15 maps the IP address that leads to user 11 into an arbitrary IP address and communicates the arbitrary/true IP address mapping of to its edge switches. It then communicates the arbitrarily selected IP address to call agent 25 and, thence, to gateway 20. In this way, gateways 10 and 20 never know the true IP addresses of each other.

There are a number of problems with this solution.

This solution requires precise timing between the packet network and the call agents. If the messages to the edge switches are sent too soon, customers can obtain free service (for a short duration); if too late, the voice path might not be established by the time gateway 20 is answered, resulting in clipping of the initial speech.

The call agent must know the characteristics of the packet network, because the procedures for establishing connections are different for each type, and the packet network may provide permanent connections (PVCs), temporary connections (SVCs), or no connections at all (as in IP).

An end-to-end connection may require several networks: private networks, local public networks, inter-exchange carrier networks, and/or international networks. This communication must take place in each of these separate networks, adding to the complexity.

For reliability, it is desirable to have the option to serve a particular gateway by any one of a multiple number of call agents and edge switches. However, for any given call, only one specific call agent/edge switch pair is involved. Reliably establishing the communication between the right ones in real time is difficult and requires the call agents to have accurate knowledge of the connection network topology as well as either additional network elements to keep the status of each call agent and edge switch and/or some kind of broadcast mechanism to insure the "right" edge switch gets the information. Additionally, in some cases (e.g. failure), the connection may even be re-established in the middle of a call, again, preferably without interaction with, or even knowledge of, the call agent. The issue of reliability is further complicated by the distributed nature of most edge switches themselves, with termination cards within the edge switch performing much if not all of the connection processing. The connection request will be received by one termination card, necessitating the same communication needs as between the call agent/edge switch, in that either the correct card must be identified and informed, or all requests must be broadcast to all cards.

SUMMARY OF THE INVENTION

The prior art problems are overcome and an advance in the art is achieved by eliminating the need for a call agent to send mapping information directly to edge switches. This is achieved by all edge nodes mapping received packet addresses in accordance with a predetermined function. The mapping according to the function may change at regular intervals, or upon the occurrence of specified events, and with each change, the communicating user is provided with a different address to be used. In one embodiment, the mapped destination address that is created is developed through a process that encrypts the true address. The changed mapping in the context of an encryption scheme can be effected by merely specifying a different random seed value in the encryption algorithm.

DETAILED DESCRIPTION

Figure 1:
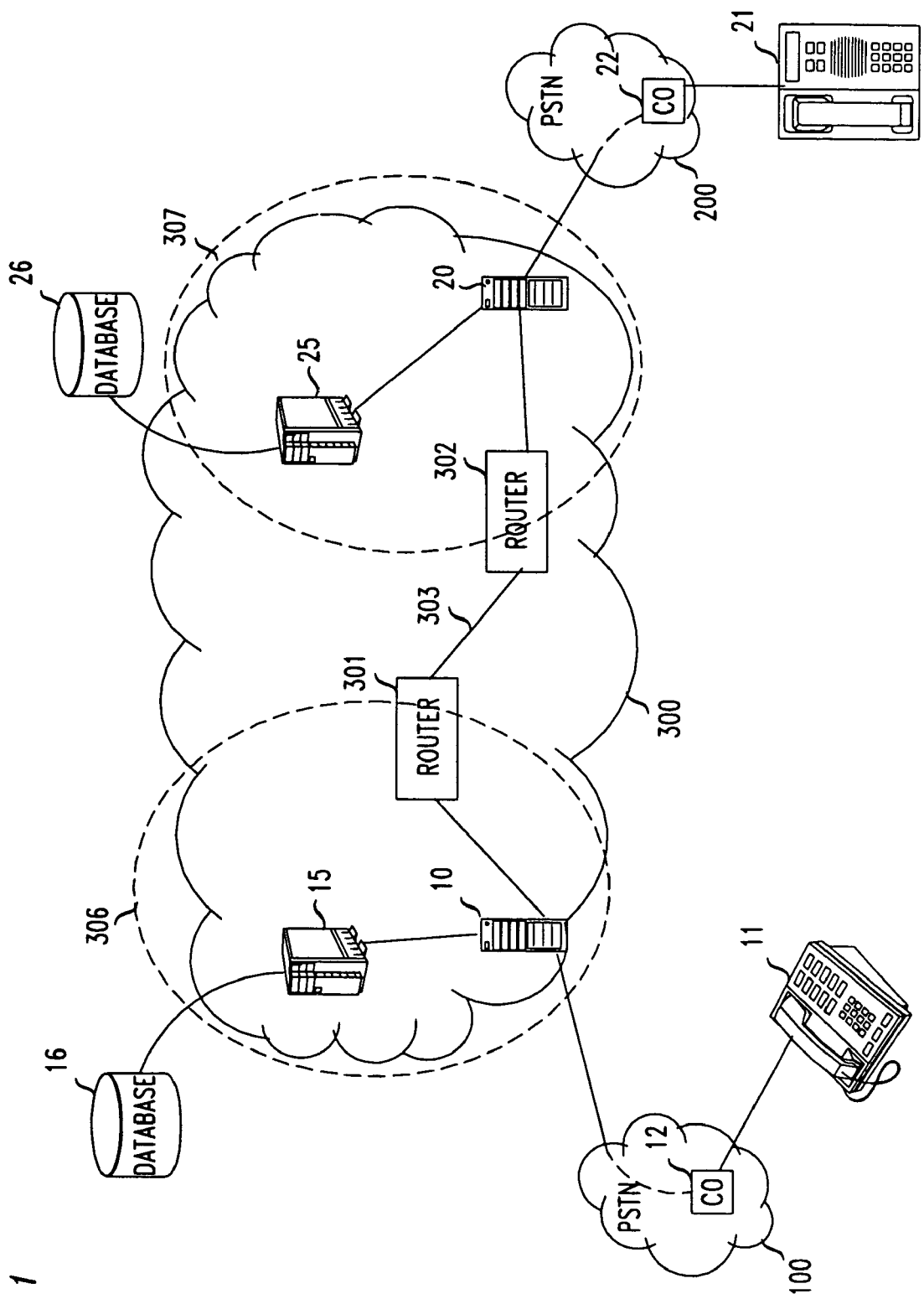
FIG. 1 describes the prior art arrangement of establishing voice connections over a packet network.
Figure 2:
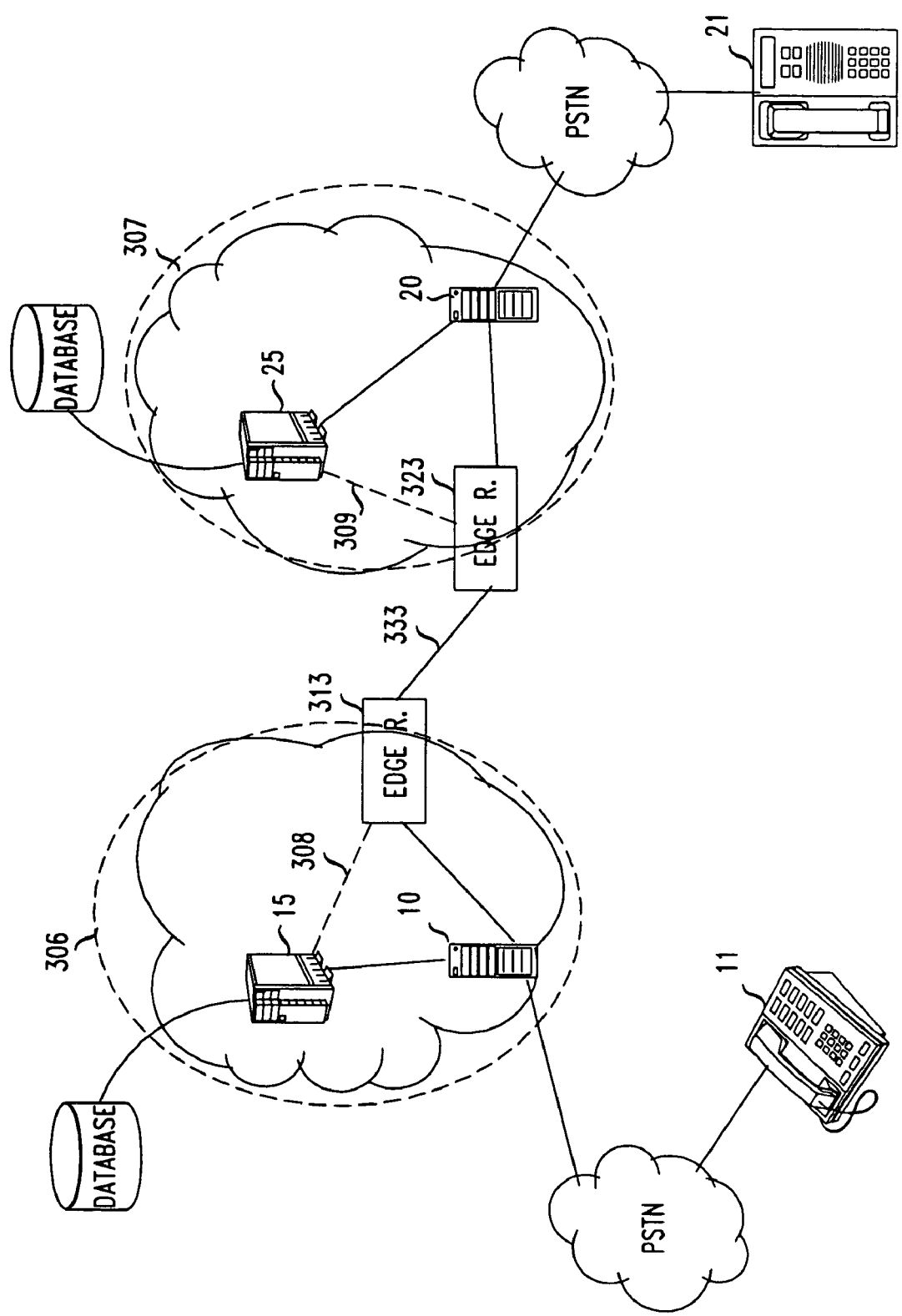
FIG. 2 describes the use of back-to-back edge switches between networks that aim to insure no unauthorized transmissions between networks.
Figure 3:
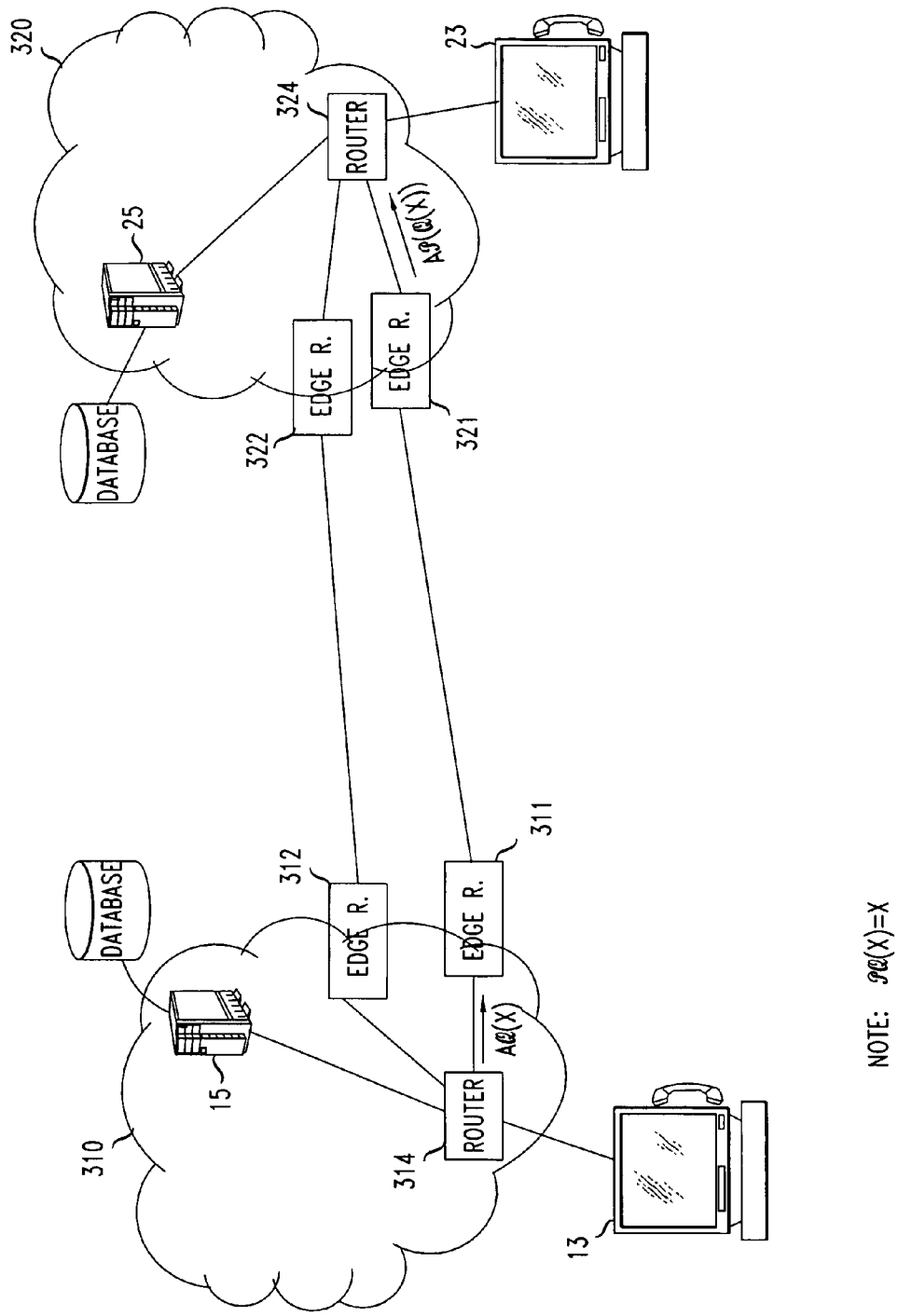
FIG. 3 shows an arrangement where edge switches perform mappings without direct communication from call agents.

FIG. 3 illustrates a packet network arrangement that comports with the principles of this invention; and with respect to those principles, it is similar to the FIG. 1 arrangement. For illustrative purposes, however, instead of a single network as shown in FIG. 1, FIG. 3 depicts an ATM network 310, and an ATM network 320; instead of gateway 10, PSTN 100 and user 11, there is an MTA 13 that is connected to switch 314 within network 310; and instead of gateway 20, PSTN 200 and user 12, there is an MTA 23 that is connected to switch 324 within network 320.

It is noted that the switches in ATM networks perform essentially the same function as do the routers in IP networks. In this disclosure, therefore, the term "node" is used to subsume both a router and a switch.

For convenience, it may be assumed that MTA 13 is in New York and network 310 is owned by Verizon, that MTA 23 is in Los Angeles and network 320 is owned by PacTel, and that the connection between networks 310 and 320 is either direct, or circuit-switched, over a network owned by an inter-exchange carrier (not shown). Also, MTA 13 homes-in onto edge switches 311 and 312, to illustrate that, for increased reliability, two parallel paths may be conditioned to carry a connection between MTAs 13 and 23. Likewise, MTA 23 homes-in onto edge switches 321 and 322.

In accord with the principles disclosed herein, edge switches of a packet network—being the only points of general entry from another packet network—translate a predetermined portion of the address of incoming packets in accordance with a predetermined functional mapping. The portion that is functionally mapped is that portion that is expected to have been previously mapped by another functional mapping. The portion that is not mapped is that portion that is considered to be "clear."

No information needs to be communicated from a call agent to its associated edge switches. This mapping may be employed in the edge switches of the entire network (e.g. network 310), in edge switches of a particular domain, in a particular edge switch of the network, or even associated only with a particular call. The mapping may be through operation of a specified functional expression, or table-based. Illustratively, the mapping may be a decryption of a value that, when decrypted, yields the address of the destination MTA.

Further in accord with the principles disclosed herein and in cognizance of the actions taken at edge switches, a remote source of packets that arrive at the edge switches of a network and are destined to an MTA at a given network address of the network (or, expressed more generally, destined to a port that has a network address) is not provided with this given network address of the destination MTA but, rather, is provided with a mapped version of the given address. The mapped version of the given address is such that when processed by the edge switches (i.e., mapped/decrypted) results in the true network address of the destination MTA. For example, if the destination MTA has a network address j, the address provided to a remote source of packets is $A \cdot \mathcal{Q}(j)$, where "A" corresponds to a concatenated address portion that is in the "clear," while the $\mathcal{Q}(j)$ is the mapped network address of the MTA. The remote source sends out packets that carry the address $A \cdot \mathcal{Q}(j)$. Based the clear portion of the address, the packets reach the network where the desired MTA is located, and the edge switches apply the mapped portion of the incoming address, $\mathcal{Q}(j)$, to function $\mathcal{P}$, to yield $\mathcal{P}(\mathcal{Q}(j))$, which equals j because the functions $\mathcal{P}$ and $\mathcal{Q}$ are chosen to have this property.

Because the call agent already knows the addresses of the MTAs in its domain, it is advantageous keep the mapping function $\mathcal{Q}(j)$ in the call agents.

The mapping that is carried out by the edge switches for general packet communication may be long-lived, or short-lived; for example, valid only for one minute. In applications where the mapping function $\mathcal{P}$ is not fixed, the mapping function $\mathcal{Q}$ must change in synchronism with changes in mapping function $\mathcal{P}$ (or vice versa). In applications where the changes occur based on time of day, for example, this can be achieved by use of a common clock. Illustratively, the changes in functions $\mathcal{P}$ and $\mathcal{Q}$ might take place in response to a reception of a broadcast signal.

To illustrate further, a network might use a pair of complementary encryption keys for the functions $\mathcal{P}$ and $\mathcal{Q}$ (i.e., $\mathcal{P}(\mathcal{Q}(j))=j$). In such an arrangement, the remote MTAs are given an address that has been encrypted with the key that corresponds to $\mathcal{Q}$, and the edge switches decrypt with the key that corresponds to $\mathcal{P}$. Both keys may be algorithmically developed using a starting value (sometimes called a "seed"). For example, the arrangement between the call agents and the edge switches might be that both entities work off a common set of seed values that are respectively pre-stored in a memory of the call agent and in a memory of the edge switches, and each minute of the day they independently create their respective keys by accessing the same (or complementary) seed values. Encryption functions such as the ones described above are well known in the art. See, for example, "Applied Cryptography," by Bruce Schneier, John Wiley & Sons, 1996.

The synchronization between the call agent's interval clock when mapping function $\mathcal{Q}$ is changed, and the clock interval mappings when the edge switches change the mapping function $\mathcal{P}$ need not be precise and, therefore, there is no need for the call agent to communicate directly with the associated edge switches to insure this synchronization. Even for a relatively short time interval such as one minute, a time offset between the call agent and the edge switches of a few seconds is not a problem as long as the edge switches are quicker to switch to a new mapping function than the associated call agent, but continue to remember the old mapping function. Time-adjacent mappings can be selected so that a mapping of an address that was mapped in accordance with the immediately previous mapping function yields an address that is recognized to be incorrect. In such an event, the previous mapping function is used to produce the correct mapping.

Figure 4:
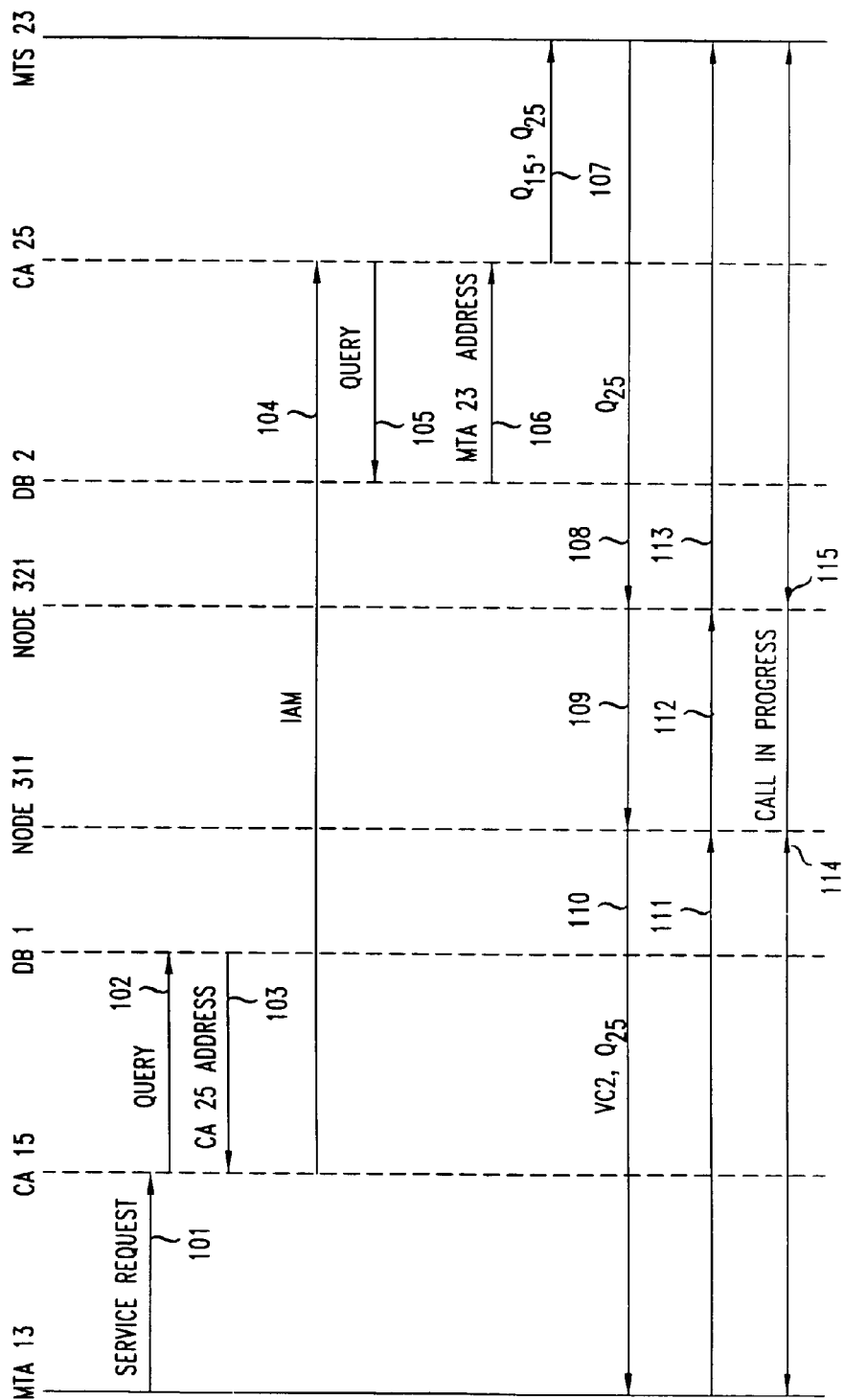
FIG. 4 presents a signal flow diagram in conformance with the principles disclosed herein.

FIG. 4 presents a signal flow diagram for an implementation in accord with the principles of this invention for the FIG. 3 arrangement. For this illustration, it is assumed that networks 310 and 320 are ATM networks using Bearer Independent Call Control (BICC) protocol for call agent to call agent signaling, and establishing Switched Virtual Circuits (SVCs) for connection control.

When MTA 13 wishes to place a call, it sends a service request to call agent (CA) 15 (line 101—e.g., Q.2931 protocol). In sending the service request, MTA 13 provides information about its own network address, and the identity of the called party (for example, MTA 23). In response to the latter, call agent 15 queries its database (line 102) for the address of a call agent that handles the domain within which MTA 23 resides. Concurrently, it identifies the applicable mapping function, $\mathcal{Q}_{15}{}^i$ and, once the database responds (line 103), call agent 15 is in possession of the following:

(a) the address of call agent 25,
(b) the "clear" portion of an ID for reaching the domain of MTA 23, $A_{320}$,
(c) the mapping function $\mathcal{Q}_{15}{}^i$,
(d) the address of MTA 13 (X1),
(e) the "clear" portion of an ID for reaching the domain of MTA 13, $A_{310}$, and
(f) an identification of the called party MTA 23.

The subscript (15) in $\mathcal{Q}_{15}{}^i$ designates the call agent that provides the mapping function, and the superscript ($i$) is an index that designates a particular mapping function; i.e., $\mathcal{Q}_{15}{}^i \neq \mathcal{Q}_{15}{}^j$ when $i \neq j$. Call agent 15 maps X1 with $\mathcal{Q}_{15}{}^i$, and proceeds to send an Initial Address Message (IAM) to call agent 25 (line 104) that includes $\mathcal{Q}_{15}{}^i$ (X1) (the result obtained by mapping address X1 with mapping function $\mathcal{Q}_{15}{}^i$), the "clear" portion of an ID for reaching its domain, $A_{310}$, and an identification of the called party. Illustratively, call agent 15 communicates with call agent 25 via the SS7 signaling network (not shown for sake of clarity).

When the IAM is received, call agent 25 queries its database (line 105) to identify the network address of MTA 23. Having received the network address of MTA 23 (X2) from its database (line 106), call agent 25 maps address X2 with mapping function $\mathcal{Q}_{25}{}^i$ to arrive at $\mathcal{Q}_{25}{}^i$ (X2). Call agent 25 then provides MTA 23 (line 107) the values $A_{310} \cdot \mathcal{Q}_{15}{}^i$ (X1), and $A_{320} \cdot \mathcal{Q}_{25}{}^i$ (X2), allowing MTA 23 to send out a "connect" message (line 108) to $A_{310} \cdot \mathcal{Q}_{15}{}^i$ (X1).

In the illustrative FIG. 3 network, which is an ATM network, the "connect" message traverses network 320 towards the destination specified by the "clear" portion of the address, to wit, $A_{310}$, and then through network 310 based on the mapped address $\mathcal{P}_{15}{}^i(\mathcal{C}_{15}{}^i(X1))$. That is, based on provisioned information within the switches of network 320, the "connect" message is routed to edge switch 321 (for example). Edge switch 321 uses its provisioned information to route the "connect" message to edge switch 311 (line 109) where the mapped address portion, $\mathcal{C}_{15}{}^i(X1)$, is applied to mapping function $\mathcal{P}_{15}{}^i$. Presuming that the correct mapping information was provided by call agent 15, the mapping within edge switch 311 yields the address X1 and, thereafter, based on provisioned information within the switches of network 310, the "connect" message is routed to MTA 13 (line 110). As the "connect" message proceeds to traverse the networks, a Virtual Path Identifier (VPI) and a Virtual Circuit Identifier (VCI) are selected for each link in the connection from MTA 23 to MTA 13, and a mapping is established within each switch in the traversed path that associates a particular output VPI/VCI for the input VPI, VCI pair. This allows future packets to be switched and, thus, routed strictly based on the VPI and VCI identifiers, in accordance with conventional ATM operations.

The "connection" message from MTA 23 also includes the ID of the destination network, $A_{320}$, and $\mathcal{C}_{25}{}^i(X2)$. Once the "connect" message arrives at MTA 13, the MTA is able to send an acknowledgement message to MTA 23 by addressing the acknowledgement message to $A_{320} \cdot \mathcal{C}_{25}{}^i(X2)$. The acknowledgement message traverses network 310 and then network 320, and in the process it establishes appropriate mappings in the traversed switched to establish a VPI, VCI identifier for each link in the path from MTA 13 to MTA 23, in the manner described above (lines 111-113).

Once the connection paths are established between MTA 23 and MTA 13, and vice versa, communication can proceed in both directions, as depicted by lines 114 and 115 in FIG. 4, with MTA 23 using the address $A_{310} \cdot \mathcal{C}_{15}{}^i(X1)$ and MTA 13 using the address $A_{320} \cdot \mathcal{C}_{25}{}^i(X2)$.

At the conclusion of each mapping within edge switches 312 and 232, as indicated above, the edge switch ascertains whether the mapped value is valid. When the mapped value is not valid, the edge switch makes a second try by mapping with the immediately previous mapping function; for example, $\mathcal{C}_{25}{}^i(X2)$ with $\mathcal{P}_{25}{}^{i-1}$. If the second-try mapping also results in an invalid mapped result, the packet is discarded.

The conversion of the address X1 to $\mathcal{C}_{15}{}^i(X1)$ provides not only security, but also allows call agent 15 to influence the routing decisions made by edge switches in the destination network (edge switch 321). The choice of alternate routes, where available (here edge switches 311 and 312), can now be made not only in cases of failure, but also for other purposes such as to manage traffic and provide QoS.

Note that call agent 15 and call agent 25 need not have any knowledge of how packets are routed by edge switch 311 and edge switch 321. If conditions change and an edge switch fails or becomes congested, the other edge switches can route around these problems without any action or knowledge on the part of the call agents, as long as these edge switches have knowledge of the appropriate mapping functions. In some cases, this rerouting can be accomplished during the call when the packet protocol allows this, e.g., in the IP protocol, or some implementations of the ATM protocol. This rerouting can be accomplished at call setup without the call agents' knowledge of the connection topology and which specific edge switches will be involved in the call.

The description above mentioned that the communication between call agent 15 and call agent 25 may be via the SS7 signaling network. Another approach is to employ the networks that are used for communication (e.g. between MTA 13 and MTA 23). The latter approach, however, needs to include the ability of the call agents to reach each other in spite of the mappings performed in the edge switches that handle packets that are destined to MTAs. This can be achieved with the edge switches that refrain from applying their mapping function to packets that are destined to a call agent. Alternatively, call agents may use specially designated edge routes that do not perform any mapping, but are restricted to route packets only to call agents.

Figure 5:
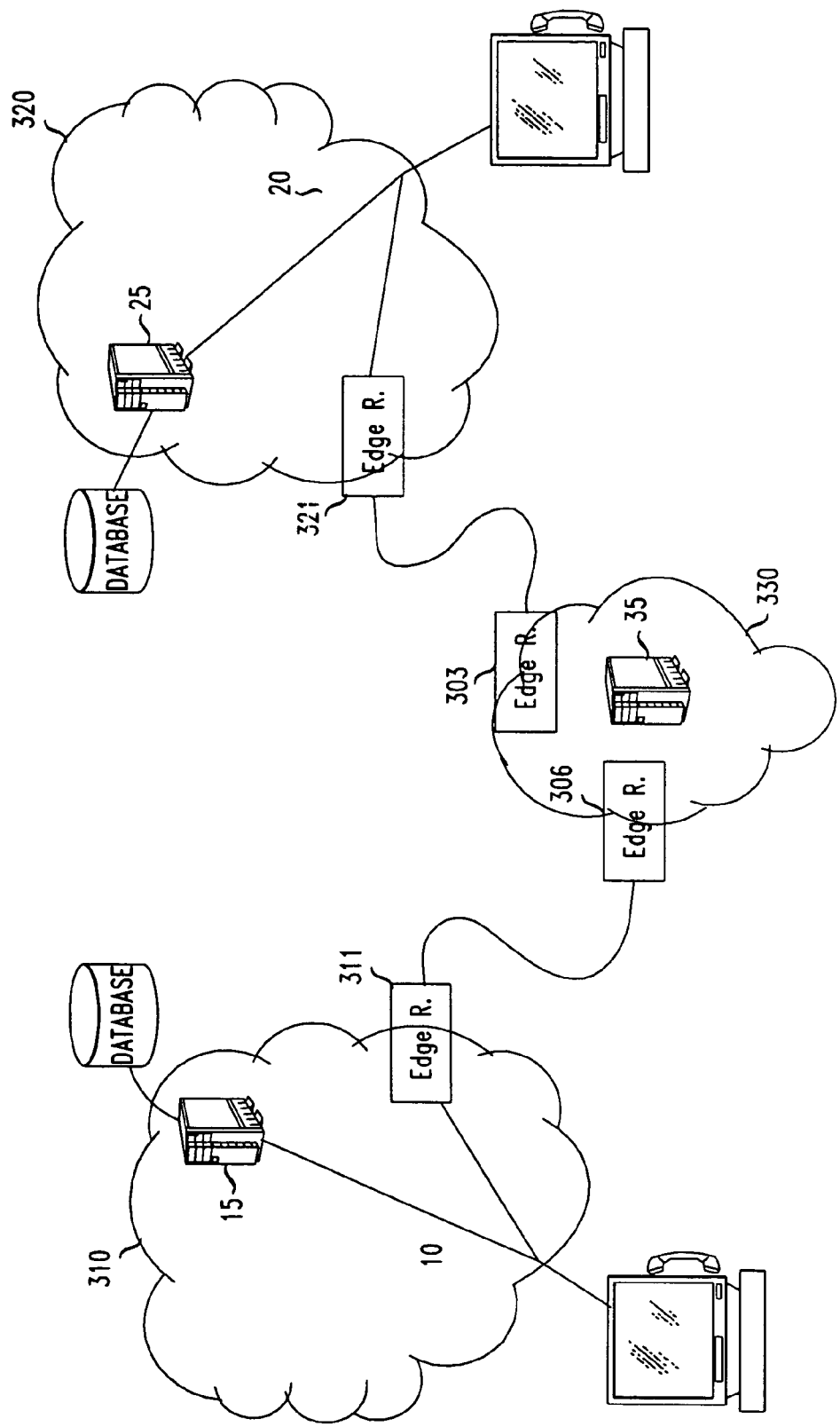
FIG. 5 shows an arrangement with two networks interposed between the networks of the two communicating devices.

As indicated above, the connection between networks 310 and 320 can be direct, or through one or more networks. FIG. 5 explicitly illustrates this condition; with network 330 interposed between networks 310 and 320. To simplify the drawing, only one edge node is shown to be involved in the connection involving networks 310, 320, and 330. Basically, the issue in the FIG. 5 arrangement is how to establish a connection between the networks in consonance with the principles disclosed herein.

There are numerous approaches that can be employed in connection with the intermediate networks. One approach, for example, has call agent 15 identify the intermediate networks and send that information to call agent 25; for example, $A_{330} \cdot A_{340} \cdot A_{310} \cdot \mathcal{C}_{15}{}^i(X1)$. A "connect" message can then be addressed from MTA 23 to network address $A_{330} \cdot A_{340} \cdot A_{310} \cdot \mathcal{C}_{15}{}^i(X1)$, and including the values $A_{320}$ and $\mathcal{C}_{25}{}^i(X2)$ within the "connect" message enables MTA 13 to send an acknowledgement message to $A_{340} \cdot A_{330} \cdot A_{320} \cdot \mathcal{C}_{25}{}^i(X2)$. This approach traverses the intermediate networks without any mappings and inverse mappings, and basically treats the intermediate networks as free resources.

When the intermediate networks wish to block traffic except that which they get paid for, one approach that can be employed is the functional mappings-inverse mappings that are disclosed herein. In accordance with this approach, the traversal through any network is preceded by a mapping of an address portion at the incoming edge node and, therefore, the "connect" message that MTA 23 needs to send in the FIG. 5 arrangement is addressed to $$A_{330} \cdot \mathcal{C}_{35}{}^i(A_{340}) \cdot \mathcal{C}_{45}{}^i(A_{310}) \cdot \mathcal{C}_{15}{}^i(X1),$$

and the acknowledgement message is addressed to $$A_{340} \cdot \mathcal{C}_{45}{}^i(A_{330}) \cdot \mathcal{C}_{35}{}^i(A_{320}) \cdot \mathcal{C}_{25}{}^i(X2).$$

The values $A_{310}$ and $\mathcal{C}_{15}{}^i(X1)$ are provided to call agent 25 by call agent 15. Call agent 15 obtains the values $A_{340}$, $A_{330}$, and $A_{320}$ from its database, forwards values $A_{310}$, and $A_{330}$ to call agent 45, and instructs it to send $\mathcal{C}_{45}{}^i(A_{310})$ and $\mathcal{C}_{45}{}^i(A_{330})$ to call agent 25. Similarly, call agent 15 forwards values $A_{340}$, and $A_{330}$ to call agent 35, and instructs it to send $\mathcal{C}_{35}{}^i(A_{340})$ and $\mathcal{C}_{35}{}^i(A_{320})$ to call agent 25. Call agent 25 then provided MTA 23 with the above values, including $\mathcal{C}_{25}{}^i(X2)$, thus supplying all of the necessary information for setting up a connection.

A similar approach, resulting in the same addressing but not requiring full knowledge of the path, is for each call agent to determine the next network in the path, map the previous network's address, and concatenate its "clear" address to the resultant address.

As indicated above, the selection of FIG. 3 network as an ATM network was merely illustrative. It should be noted that the principles disclosed herein are applicable to other packet technologies, call control protocols and connection methods.

It should be also appreciated that though the mappings performed in the edge nodes, and the mappings performed in the call agents are functional, in the sense that given an address the mapped value can be computed, this computing to obtain the mapped value can be replaced with a look-up table. It should also be appreciated that various, arbitrarily selected, parameters can be included in the process that chooses the mapping functions $\mathcal{P}$ and $\mathcal{Q}$. This is particularly so when the call agents and the edge nodes take their respective cues for changing functions $\mathcal{P}$ and $\mathcal{Q}$ from a received broadcast signal.

The invention claimed is:

1. A method for communicating packets from a packet source in a first network to a packet destination in a second network, where said packet destination has a network address X, comprising the steps of:
   communicating, from an element in said second network to an element in said first network, an address Y that corresponds to address X mapped with encryption key $\mathcal{Q}$; and
   mapping, in a node in said second network, at least a predetermined portion of an address field contained in packets received from said first network with decryption key $\mathcal{P}$, where said keys $\mathcal{Q}$ and $\mathcal{P}$ such that $\mathcal{P}(\mathcal{Q}(X))=X$, and where changes to said keys $\mathcal{Q}$ and $\mathcal{P}$ upon occurrence of an event or in accord with a predetermined algorithm.

2. The method of claim 1 where said keys Q and P change by reference to a table that is stored in said element of said second network, and a table that is stored in said node.

3. The method of claim 2 where said table in said node contains seed values that are used to develop said decryption key $\mathcal{P}$, and said table in said element of said second network contains seed values that are used to develop said encryption key $\mathcal{Q}$.

4. A method for communicating packets from a packet source in a first network to a packet destination in a second network, where said packet destination has a network address X, comprising the steps of:
   communicating, from an element in said second network to an element in said first network, an address Y that corresponds to address X mapped with encryption key $\mathcal{Q}$; and
   mapping, in a node in said second network, at least a predetermined portion of an address field contained in packets received from said first network with decryption key $\mathcal{P}$, where said keys $\mathcal{Q}$ and $\mathcal{P}$ such that $\mathcal{P}(\mathcal{Q}(X))=X$, further comprising said node, after performing said step of mapping, carrying out the steps of:
   determining whether result of said mapping correspond to a valid packet destination in said second network; and
   if said step of determining concludes that said result of said mapping does not correspond to a valid packet destination in said second network, mapping said at least predetermined portion of the address field contained in packets received from said first network with a key $\mathcal{P}'$, which corresponds to the mapping function employed by said node prior to the last change in mapping key $\mathcal{P}$.

* * * * *